(12) United States Patent
Hancock

(10) Patent No.: US 9,493,105 B2
(45) Date of Patent: Nov. 15, 2016

(54) SECUREMENT SYSTEM FOR TRANSPORTING CARGO

(71) Applicant: Doepker Industries Ltd., Annaheim (CA)

(72) Inventor: Steven Herbert Hancock, Huntsville (CA)

(73) Assignee: DOEPKER INDUSTRIES LTD., Annaheim, Saskatchewan (CA)

( * ) Notice: Subject to any disclaimer, the term of this patent is extended or adjusted under 35 U.S.C. 154(b) by 76 days.

(21) Appl. No.: 14/599,667

(22) Filed: Jan. 19, 2015

(65) Prior Publication Data

US 2016/0207439 A1 Jul. 21, 2016

(51) Int. Cl.
B60P 7/08 (2006.01)

(52) U.S. Cl.
CPC ............ B60P 7/0815 (2013.01); B60P 7/0823 (2013.01)

(58) Field of Classification Search
CPC ........ B60J 5/065; B61D 45/001; B64D 9/00; B60P 7/0815; B60P 7/0807; B62D 25/2054
USPC ....... 410/104, 106, 110, 116, 50; 296/184.1, 296/100.01, 186.2, 100.17; 362/23.13, 561, 362/612, 551, 555
See application file for complete search history.

(56) References Cited

U.S. PATENT DOCUMENTS

| 4,226,465 | A | * | 10/1980 | McCullough | ......... B60P 7/0807 105/414 |
| 4,671,562 | A | | 6/1987 | Broadbent | |
| 5,416,956 | A | * | 5/1995 | Rubin | ................... B60P 7/0823 24/199 |
| 6,065,796 | A | | 5/2000 | Verduyn | |
| 6,527,487 | B2 | | 3/2003 | Adams | |
| 6,626,623 | B2 | * | 9/2003 | DeLay | ................. B61D 45/001 410/105 |
| 8,038,374 | B2 | * | 10/2011 | Russell | ................. B60P 7/0807 410/106 |
| 8,393,838 | B2 | * | 3/2013 | Plazek | ................. B60P 7/0807 410/104 |
| 8,439,427 | B2 | | 5/2013 | Adams | |

* cited by examiner

Primary Examiner — Glenn Dayoan
Assistant Examiner — Sunsurraye Westbrook
(74) Attorney, Agent, or Firm — Ryan W. Dupuis; Kyle R. Saherthwaite; Ade & Company Inc.

(57) ABSTRACT

A rail member is supported longitudinally along both sides of the deck of a truck or trailer and includes a plurality of strap hook anchoring locations at spaced positions therein. Each anchoring location is defined by a pair of hook opening extending downwardly through an upper flange of the rail member. Cargo securing straps or chains are anchored onto the respective anchoring locations using an anchor member having an upper body portion defining a tie-down opening and a pair of lower hooks which can be hooked into the pair of hook openings of a selected anchoring location. The upper body portions spans between the two hook openings so as to prevent passage of the upper body portion through the hook openings while the cargo straps or chains remain slack.

19 Claims, 2 Drawing Sheets

SECUREMENT SYSTEM FOR TRANSPORTING CARGO

FIELD OF THE INVENTION

The present invention relates to a securement system for securing cargo to the deck of a load carrying vehicle, for example a flat-deck or drop-deck trailer or truck and the like, using tie-down members such as straps or chains, and more particularly the present invention relates to a securement system using anchor members which can be hooked into respective anchoring locations along a rail member extending alongside the deck of the load carrying vehicle.

BACKGROUND

Cargo is commonly transported on various decked vehicles including trucks and trailers and the like. Typically, the deck of such vehicles is provided with a rail member extending longitudinally along both sides of the deck upon which various forms of cargo straps can be secured for securing cargo to the deck. Cargo straps or tie-down members are understood herein to comprise various types of strapping material including woven or webbed material, as well as chains and the like. In some instances a curtain system is further provided for enclosing the sides of the deck during transport.

U.S. Pat. No. 6,065,796 by Verduyn and U.S. Pat. No. 4,671,562 by Broadbent disclose examples of rail members alongside a cargo deck onto which the bottom edge of a curtain can be secured using straps and hooks which are hooked onto a securement flange of the rail. Cargo straps may also be hooked onto the rail in each instance, however, when the cargo straps remain slack, the hooks readily fall out of place, making it difficult to secure the cargo.

U.S. Pat. No. 8,439,427 by Adams discloses a further example of a strap system for a cargo deck in which apertures are provided at longitudinally spaced positions in both the upper and lower walls of the rail member. Hooks on the ends of straps are taught to be inserted fully through both the upper and lower apertures of the side rail to fully receive the straps through the rail for hooking to an area below the rail. Accordingly, when the strap members are slack, the hooks can again fall readily out of place such that the securement process may be difficult for a single user.

U.S. Pat. No. 6,527,487, also to Adams, discloses an extruded rail member at the opposing sides of the cargo deck in which a continuous channel is provided in the upper surface having a hooking flange along the full length of the rail member. A specific configuration of hook member is required to mate with the hooking flange and requires a special curved profile which may be costly and difficult to accurately manufacture. Furthermore, as the hooking edge is a continuous channel, no lateral stability is provided to the hooks when the straps are slack such that no assistance is provided to maintain the hook in a slack condition nor is any guidance provided with regard to longitudinal positioning of the hook relative to the rail member.

SUMMARY OF THE INVENTION

According to one aspect of the invention there is provided a cargo securement system for use with tie-down members for securing cargo to a deck of a load carrying vehicle, the system comprising:
 a rail member for being supported longitudinally alongside the deck, the rail member including an upper flange portion having at least one anchoring location defined therein in which said at least one anchoring location comprises at least one hook opening extending downwardly through the upper flange portion; and
 an anchor member comprising:
  an upper body portion having a receiving portion suitable for anchoring a tie-down member thereto; and
  at least one lower hook depending from the upper body portion;
 said at least one lower hook being receivable within said at least one hook opening in the rail member and being retainable on the upper flange portion by hooking; and
 the upper body portion being shaped so as to prevent passage of the upper body portion through said at least one hook opening receiving said at least one lower hook therein.

By providing specific openings in the rails together with anchor members that mate with the openings, proper aligned longitudinal placement of the anchor members is ensured relative to corresponding anchor members on the other side of the deck. Furthermore, by providing an upper body shaped to prevent passage through the hook openings in the rail member, the anchor members will not fall through even when the tie-down members are slack. When the tie-down members are slack, the upper wall of the rail member about the openings provides both longitudinal positioning and lateral stability to the hook during the securement process. Furthermore, the location of the hook openings in the top wall of the rail member ensures that the tie-down members for securing cargo do not interfere with any curtain system which may also be provided and which is thus enabled to be secured externally outwardly and below the securement of the tie-down members.

According to a second aspect of the present invention there is provided a load carrying vehicle comprising:
 a deck arranged to support a load thereon;
 a rail member supported longitudinally alongside the deck, the rail member including an upper flange portion having at least one anchoring location defined therein in which said at least one anchoring location comprises at least one hook opening extending downwardly through the upper flange portion; and
 an anchor member comprising:
  an upper body portion having a receiving portion suitable for anchoring a cargo tie-down member thereto; and
  at least one lower hook depending from the upper body portion;
 said at least one lower hook being receivable within said at least one hook opening in the rail member and being retainable on the upper flange portion by hooking; and
 the upper body portion being shaped so as to prevent passage of the upper body portion through said at least one hook opening receiving said at least one lower hook therein.

According to a third aspect of the present invention there is provided a method of securing a load to a deck of a load carrying vehicle using a tie-down member, the method comprising:
 providing a rail member supported longitudinally alongside the deck in which the rail member includes an upper flange portion having at least one anchoring location defined therein and in which said at least one anchoring location comprises at least one hook opening extending downwardly through the upper flange portion;
 providing an anchor member comprising an upper body portion secured to the tie-down member and at least one lower hook depending from the upper body portion; and inserting said at least one lower hook within said at least one hook opening in the rail member such that:
  i) the anchor member is retained by hooking onto the upper flange portion of the rail member; and
  ii) the upper body portion is prevented from passing through said at least one hook opening receiving said at least one lower hook therein.

Preferably the upper flange portion of the rail member is supported on the load carrying vehicle so as to be substantially flush with an upper surface of the deck.

Preferably the rail member includes a lower flange portion which is parallel to and spaced below the upper flange portion in which the lower flange portion is uninterrupted by any hook openings.

Preferably the upper body portion of the anchor member protrudes beyond said at least one lower hook in a longitudinal direction of the rail member so as to prevent the passage of the upper body portion through said at least one hook opening receiving said at least one lower hook therein In the preferred embodiment, each anchoring location comprises two hook openings which are spaced apart in a longitudinal direction of the rail member and the anchor member comprises two lower hooks spaced apart from one another so as to be receivable in the two hook openings respectively.

Preferably the upper body portion spans between the two lower hooks.

Preferably two hook openings of said at least one anchoring location are greater in length in the longitudinal direction of the rail member than a space between the two hook openings.

Each hook opening is preferably elongate in a longitudinal direction of the rail member.

Preferably the rail member includes a plurality of the anchoring locations formed therein at longitudinally spaced apart positions. The anchoring locations may be evenly spaced apart along the full length of the rail member, or alternatively some of the anchoring locations may be spaced apart at uneven spacings relative to one another.

In the illustrated embodiment, the upper body portion of the anchor member is a planar body which is integral with said at least one lower hook and wherein the receiving portion comprises a tie-down opening in the upper body portion.

The upper perimeter edge of the tie-down opening may further include a reinforced portion which is thicker than a remainder of the upper body portion.

The rail member may comprise a channel having a C-shaped cross-section including a lower flange portion which is parallel and spaced below the upper flange portion and a upright portion connected between the upper and lower flange portions along one side of the rail member.

In alternative embodiments, the rail member may comprise a hollow tube in which the upper flange portion comprises an uppermost wall of the hollow tube.

When provided in combination with a curtain system having at least one curtain arranged for enclosing one side of the deck of the load carrying vehicle, the rail member preferably includes at least one longitudinally extending securing edge upon which a bottom edge of said at least one curtain is arranged to be secured in which the securing edge is located downwardly in relation to the at least one hook opening in the rail member.

The load carrying vehicle may comprise a deck trailer, for example a flat deck trailer or a drop deck trailer, or alternatively the load carrying vehicle may comprise a truck having an integral deck supporting the rail members directly thereon.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
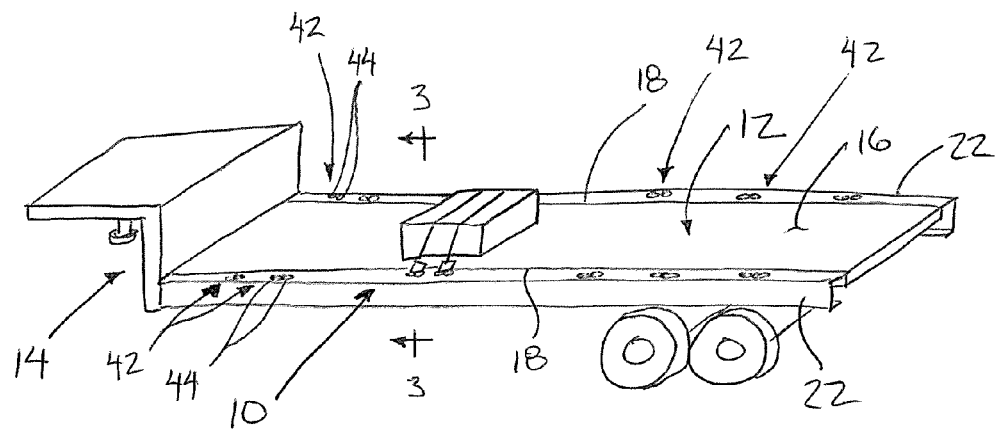
FIG. 1 is a schematic representation of a trailer upon which the cargo securement system is supported.

Referring to the accompanying figures there is illustrated a cargo securing system generally indicated by reference numeral 10. The system 10 is particularly suited for use with a load carrying vehicle including a deck 12, for example a flat deck or a drop deck trailer 14, or alternatively any form of truck including a cargo supporting deck thereon. Typically, the deck includes an upper surface 16 for supporting a load thereon which extends longitudinally in the transport direction from a front end to a rear end thereof. The deck further includes two laterally opposing side edges 18 which extend longitudinally the full length of the deck. The system 10 includes two rail members 20 which are secured to an underlying frame 24 of the vehicle 14 such that the two rail members span alongside the two laterally opposed side edges of the deck along the full length thereof in the longitudinal direction. Typically, the rail members are supported such that the top side thereof is flush with the upper surface of the deck.

In the illustrated embodiment, each rail member 22 is an extruded channel having a generally C-shaped cross section including an upper flange 26, a lower flange 28, and an upright flange 30 connected between the upper and lower flanges. The upper flange 26 is generally horizontally oriented and is flush at an upper surface thereof with the upper surface of the deck to define the top end of the rail member. The upper flange 26 spans laterally the full width of the rail member. The lower flange 28 is parallel to the upper flange and is spaced therebelow to similarly span laterally the full width of the rail member. The upright flange 30 spans vertically the full height of the rail member between an outermost edge of the upper flange and an outermost edge of the lower flange 28 to define the outer side of the rail member along the length of the trailer.

When used with a curtain system, the curtain system is typically provided with an overhead frame defining a top rail (no shown) from which a curtain member 36 is suspended for longitudinal sliding therealong. Straps 38 are provided at longitudinally spaced positions along the bottom edge of the curtain member 36 at each side of the trailer with a hook 40 at the free end of each strap 38 being suitably arranged for hooking to an innermost free edge of the lower flange 28 at the bottom side of the rail member. Typically, the curtain system is supported such that the curtain members 36 are suspended vertically along the outer side of the rail members so that the straps 38 extend externally about the outer side and the bottom side of each rail member to locate the hooks below the rail members in a hooked and engaged position thereof.

The two rail members 22 are each provided with a plurality of anchoring locations 42 therein at longitudinally spaced positions within the upper flange 26. The anchoring locations 42 are thus located laterally inwardly in relation to the curtain members which span the outer side of the rail members so that the anchoring of cargo tie-down members to the anchoring locations is laterally inwardly in relation to the curtain and provides no interference to the curtain. Tie-down members are understood herein to comprise any elongate flexible member which is supported under tension to hold-down cargo, for example straps or chains and the like.

Each anchoring location 42 is defined by two hook openings 44 which are longitudinally spaced apart from one another but which are in close proximity to one another relative to the hook openings of other anchoring locations. Each hook opening 44 is a rectangular shaped opening which is elongate in the longitudinal direction of the rail member. The longitudinal space between the two hook openings 44 at each anchoring location is arranged to be less than the corresponding length of each hook opening 44.

The dimension of each hook opening in a lateral direction is narrower than the overall width of the upper flange 26 in the lateral direction. The hook openings are also spaced outwardly from the inner side of the rail member such that a hooking portion of the upper flange 26 remains along the innermost edge of each hook opening. The hooking portions 46 of the upper flange 26 thus define an undercut hooking edge of the upper flange onto which hooks may be secured as described in further detail below.

Various forms of cargo tie-down members, for example woven or webbed strapping material, or chains and the like, may be anchored to the hook openings in the rail member by suitable anchor members 50 as described in the following. In each instance, the anchor members 50 each comprise an upper body portion 52 formed of a planar body of plate metal which is generally rectangular in shape having two opposing upright side edges 54 defining the overall width of the anchor member in the longitudinal direction of the rail members. A tie-down opening 56 is located within the upper body portion 52 at a location which is centered between the two side edges 54 and which is also generally centrally located relative to top and bottom ends of the upper body portion 52. The top end of the upper body portion defines an upper edge of the anchor member which is generally horizontally oriented between the two upright side edges 54. An auxiliary bead of material 58 is provided along the upper edge of the tie-down opening 56 such that the bead of material is thicker than the remainder of the plate body defining the upper body portion of the anchor member. The bead of material 58 also defines a rounded upper perimeter edge for the tie-down opening 56 which is generally horizontally oriented to provide a suitable edge upon which a chain hook or a strapping eyelet may be secured for securing the anchor member to a tie-down member.

Each anchor member further includes two lower hooks 60 extending downwardly from the bottom end of the upper body portion 52. The two lower hooks are integrally formed with the upper body portion from a common seamless plate of metal by folding the metal to define two laterally spaced apart hooks. Each hook has a lateral width relative to the anchor member corresponding to the width of a respective one of the hook openings of each anchoring location in the longitudinal direction of the rail member. Furthermore, the two lower hooks 60 of each anchor member are spaced apart by substantially the same spacing between two hook openings of a single anchoring location. In this manner, the two lower hooks of each anchor member are arranged for mating alignment with the two hook openings of any selected anchoring location in the rail members.

Each lower hook 60 includes a planar upper portion 62 which lies in a common plane with the upper body portion and which has a lateral dimension which fits within the longitudinal hook openings in the rail member. Each hook further includes a folded portion 64 below the planar upper portion 62 where the plate material has been folded upwardly and inwardly out of the plane of the upper body portion to define the hooking edge of the hook. The fold axis of the two hooks are in common with one another and are horizontally oriented relative to the vertical side edges 64 of the upper body portion.

Figure 2:
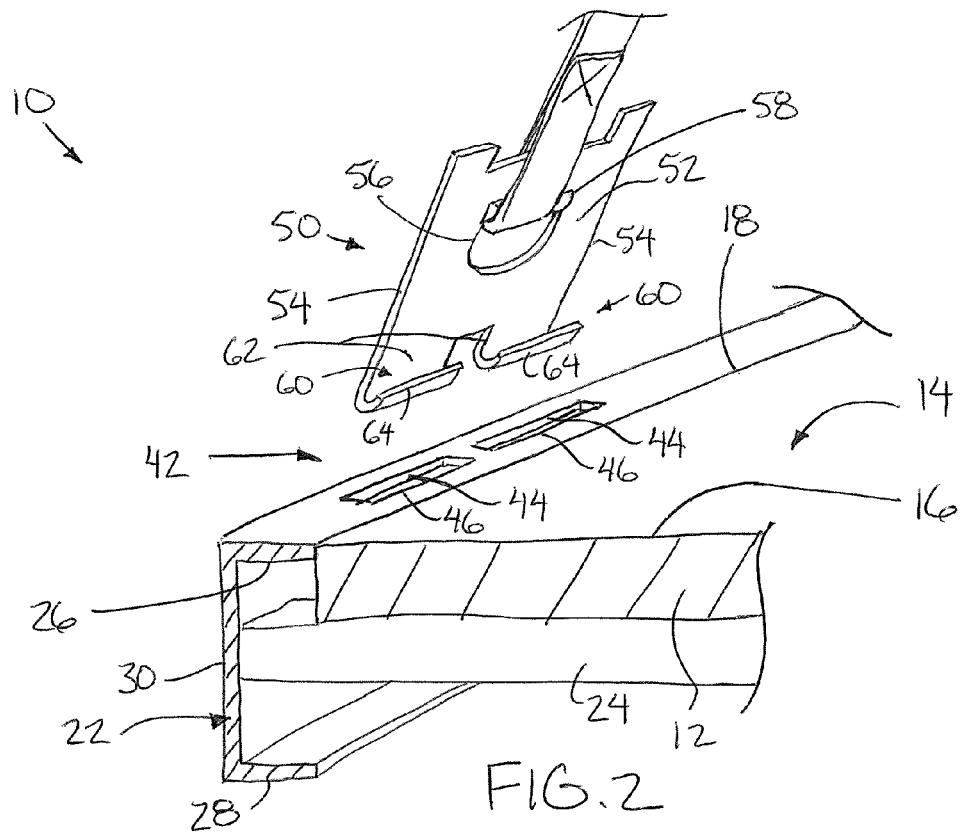
FIG. 2 is a partly sectional perspective view of one of the anchor members shown separated from the rail member of the system according to FIG. 1.
Figure 3:
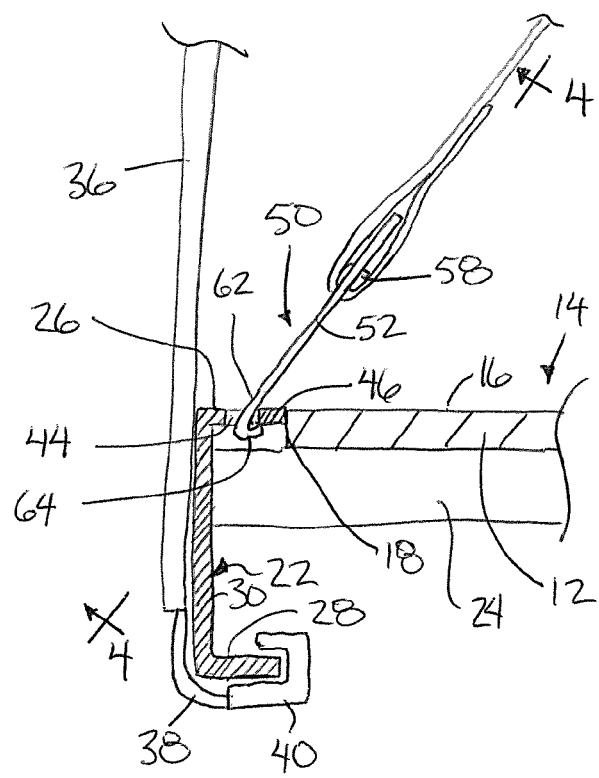
FIG. 3 is sectional view of the rail member along the line 3-3 of FIG. 1, shown with the anchor member hooked onto the rail member.
Figure 4:
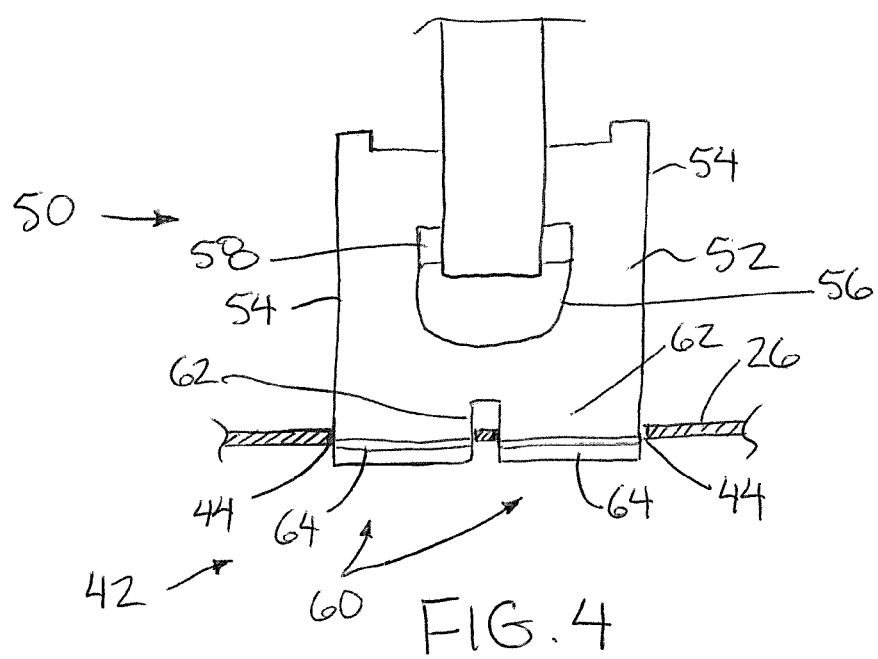
FIG. 4 is a sectional view of the rail member along the line 4-4 of FIG. 3.

The resulting overall thickness of the anchor member in a direction which is perpendicular to the plane of the upper body portion as defined by the folded portions of the two lower hooks is arranged to be greater than the corresponding lateral dimension of the hook openings in the rail member. In this manner, the folded portions 64 of the anchor members can only be inserted into the hook openings by initially orienting the upper body portion in an inclined, non-vertical orientation, for example which may be nearer to horizontal than vertical. Once the free edges of the two lower hooks are inserted downwardly through corresponding hook openings of a selected anchoring location into an engaged position within the hook openings as shown in FIGS. 3 and 4 from a disengaged position above the rail member as shown in FIG. 2, the upper body portion can be pivoted into a more upright orientation to engage the folded portions 64 of the two lower hooks below the corresponding hooking portion 46 of the upper flange of the rail member to hook the anchor members relative to the rail member.

While the tie-down members remains slack, the length of the planar upper portions 62 of the two hooks permit the folded portions to be initially positioned spaced below the upper flange such that engagement of the bottom end of the anchor member with the internal surface of the upright flange 30 maintains the anchor body in a secure upright orientation with the two hooks aligned with the hooking portion of the two hook openings ready for hooking engagement upon tightening of the cargo tie-down members.

The lateral width of the upper body portion is greater than the overall width of the two lower hooks and the space therebetween due to the upper body portion spanning the space between the two lower hooks while maintaining the outermost laterally opposed side edges of the two lower hooks substantially flush with the two outer side edges 54 of the upper body portion. A central stop portion of the upper body which spans between the two lower hooks, so as to have a longitudinal dimension which is greater than the hook openings, abuts an upper surface portion of the upper flange 26 of the rail member between the two hook openings of a selected anchoring location to prevent the upper body portion from being inserted into the rail member through the hook openings until the cargo tie-down members are tightened. In this manner, the mating arrangement of the hook openings in the rail members and the two lower hooks on each anchor member provides alignment of the anchor members with corresponding anchor members on the opposing side of the deck while also providing lateral and longitudinal stability to the hook supported within each hook opening even when the cargo tie-down members are slack to ensure accurate hook positioning and placement prior to tightening of the cargo tie-down members.

Since various modifications can be made in my invention as herein above described, it is intended that all matter contained in the accompanying specification shall be interpreted as illustrative only and not in a limiting sense.

The invention claimed is:

1. A cargo securement system for use with tie-down members for securing cargo to a deck of a load carrying vehicle, the system comprising:
a rail member extending in a longitudinal direction for being supported longitudinally alongside the deck, the rail member including an upper flange portion having at least one anchoring location defined therein in which said at least one anchoring location comprises at least one hook opening extending downwardly through the upper flange portion; and
an anchor member comprising:
an upper body portion having a receiving portion suitable for anchoring a tie-down member thereto; and
at least one lower hook depending from the upper body portion;
said at least one lower hook being receivable within said at least one hook opening in the rail member of a selected one of the anchoring locations by being inserted downwardly into said at least one hook opening from a disengaged position above the rail member to an engaged position within said at least one hook opening and being retainable on the upper flange portion by hooking under the upper flange portion in the engaged position; and
the upper body portion being shaped to include a stop portion having a greater dimension than said at least one lower hook in the longitudinal direction of the rail member so as to be arranged to abut an upper surface portion of the upper flange portion of the rail member in the engaged position of said at least one lower hook so as to prevent downward passage of the upper body portion below the upper flange portion of the rail member through said at least one hook opening receiving said at least one lower hook therein.

2. The system according to claim 1 wherein the upper flange portion of the rail member is supported on the load carrying vehicle so as to be substantially flush with an upper surface of the deck.

3. The system according to claim 1 wherein the rail member includes a lower flange portion which is parallel to and spaced below the upper flange portion, the lower flange portion being uninterrupted by any hook openings.

4. The system according to claim 1 wherein the upper body portion of the anchor member protrudes beyond said at least one lower hook in the longitudinal direction of the rail member so as to prevent the passage of the upper body portion through said at least one hook opening receiving said at least one lower hook therein.

5. The system according to claim 1 wherein said at least one anchoring location comprises two hook openings which are spaced apart in the longitudinal direction of the rail member and wherein the anchor member comprises two lower hooks spaced apart from one another so as to be receivable in the two hook openings respectively.

6. The system according to claim 5 wherein the upper body portion spans between the two lower hooks.

7. The system according to claim 5 wherein the two hook openings of said at least one anchoring location are greater in length in the longitudinal direction of the rail member than a space between the two hook openings.

8. The system according to claim 1 wherein said at least one hook opening is elongate in a longitudinal direction of the rail member.

9. The system according to claim 1 wherein the rail member includes a plurality of the anchoring locations formed therein at longitudinally spaced apart positions.

10. The system according to claim 9 wherein the anchoring locations are evenly spaced apart.

11. The system according to claim 9 wherein the anchoring locations are spaced apart at uneven spacings relative to one another.

12. The system according to claim 1 wherein the upper body portion of the anchor member is a planar body which is integral with said at least one lower hook and wherein the receiving portion comprises a tie-down opening in the upper body portion.

13. The system according to claim 12 wherein an upper perimeter edge of the tie-down opening includes a reinforced portion which is thicker than a remainder of the upper body portion.

14. The system according to claim 1 wherein the rail member comprises a channel having a C-shaped cross-section including a lower flange portion which is parallel and spaced below the upper flange portion and a upright portion connected between the upper and lower flange portions along one side of the rail member.

15. The system according to claim 1 wherein the rail member comprises a hollow tube and the upper flange portion comprises an uppermost wall of the hollow tube.

16. The system according to claim 1 in combination with a curtain system having at least one curtain arranged for enclosing one side of the deck of the load carrying vehicle, the rail member including at least one longitudinally extending securing edge upon which a bottom edge of said at least one curtain is arranged to be secured, the securing edge being located downwardly in relation to the at least one hook opening in the rail member.

17. The system according to claim 1 in combination with the load carrying vehicle, wherein the load carrying vehicle comprises a deck trailer.

18. A method of securing a load to a deck of a load carrying vehicle using a tie-down member, the method comprising:
providing a rail member supported to extend in a longitudinal direction alongside the deck in which the rail member includes an upper flange portion having at least one anchoring location defined therein and in which said at least one anchoring location comprises at least one hook opening extending downwardly through the upper flange portion;
providing an anchor member associated with a selected one of said at least one anchoring location, the anchor member comprising an upper body portion secured to the tie-down member and at least one lower hook depending from the upper body portion, the upper body portion including a stop portion which is greater in dimension than said at least one hook opening in the longitudinal direction of the rail member; and
inserting said at least one lower hook downwardly into said at least one hook opening of the selected one of said at least one anchoring location in the rail member from a disengaged position above the rail member to an engaged position within said at least one hook opening such that in the engaged position:

i) the anchor member is retained on the rail member by hooking of the said at least one lower hook onto the upper flange portion of the rail member; and ii) the upper body portion is prevented from passing downwardly through said at least one hook opening receiving said at least one lower hook therein to a location below the upper flange portion by engagement of the stop portion of the upper body portion with an upper surface portion of the upper flange portion of the rail member.

19. A cargo securement system for use with tie-down members for securing cargo to a deck of a load carrying vehicle, the system comprising:

a rail member extending in a longitudinal direction for being supported longitudinally alongside the deck, the rail member including an upper flange portion having at least one anchoring location defined therein in which said at least one anchoring location comprises two hook openings extending downwardly through the upper flange portion at spaced apart locations in the longitudinal direction and an upper surface portion of the upper flange portion of the rail member between the two hook openings; and an anchor member comprising:

an upper body portion having a receiving portion suitable for anchoring a tie-down member thereto; and two lower hooks depending from the upper body portion;

the two lower hooks being receivable within respective ones of the two hook openings of a selected one of the anchoring locations in the rail member by being inserted downwardly into the hook openings from a disengaged position above the rail member to an engaged position within the hook openings and being retainable on the upper flange portion by hooking under the upper flange portion in the engaged position; and the upper body portion being shaped to include a stop portion extending between the two lower hooks in the longitudinal direction of the rail member so as to be arranged to abut said upper surface portion between the two hook openings in the engaged position so as to prevent downward passage of the upper body portion through the hook openings to a location below the upper flange portion of the rail member.

* * * * *